US006891344B2

(12) United States Patent
Sakai et al.

(10) Patent No.: US 6,891,344 B2
(45) Date of Patent: May 10, 2005

(54) AUTOMATIC OPENING AND CLOSING APPARATUS FOR VEHICLE

(75) Inventors: Hiroshi Sakai, Kiryu (JP); Yasushi Yoshida, Kiryu (JP); Takashi Hoshino, Isesaki (JP); Seiji Shioiri, Kiryu (JP); Takao Ochiai, Ashikaga (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/350,773

(22) Filed: Jan. 24, 2003

(65) Prior Publication Data

US 2003/0141834 A1 Jul. 31, 2003

(30) Foreign Application Priority Data

Jan. 25, 2002 (JP) ....................................... 2002-017434

(51) Int. Cl.[7] ............................ H02P 1/04; E05F 15/10; E05D 15/28; G05D 3/12; H02K 7/116

(52) U.S. Cl. ......................... 318/280; 318/286; 318/10; 318/266; 318/466; 318/65; 49/340; 49/252; 49/341; 49/344; 296/146.8; 74/422; 74/89.11

(58) Field of Search ........................... 49/324–363, 212, 49/221, 280, 223, 261, 250–252, 323; 318/280–286, 9, 10, 15, 265, 266, 65, 466, 468; 296/56, 146.8; 74/421 A, 422, 89.11, 89.32, 89.33

(56) References Cited

U.S. PATENT DOCUMENTS 2,806,689 A * 9/1957 Miller .......................... 74/422
3,343,303 A 9/1967 Wanlass ....................... 49/280
4,739,585 A 4/1988 Pickles ......................... 49/280
4,881,018 A 11/1989 Kato et al. ...................... 318/9
5,448,856 A 9/1995 Moore et al. .................. 49/340
5,563,483 A 10/1996 Kowall et al. .............. 318/283
5,625,981 A * 5/1997 Klein et al. .................... 49/227
RE36,267 E 8/1999 Moore et al. .................. 49/340
6,155,717 A * 12/2000 Michioka et al. ............. 384/15
6,216,393 B1 4/2001 Apprich ........................ 49/212
6,220,649 B1 * 4/2001 Rife ......................... 296/146.8
6,250,169 B1 * 6/2001 Weisser ........................ 74/422

(Continued)

FOREIGN PATENT DOCUMENTS

| | | | |
|---|---|---|---|
| EP | 0 774 370 A2 | 8/1996 | |
| JP | 59-96275 | 6/1984 | |
| JP | 61-67377 | 5/1986 | |
| JP | 2000264067 A * | 9/2000 | .............. B60J/5/10 |
| JP | 2001-253241 | 9/2001 | |
| JP | 2002087065 A * | 3/2002 | .............. B60J/5/10 |
| WO | WO 00/36259 | 6/2000 | |
| WO | WO 01/83924 A1 | 11/2001 | |

OTHER PUBLICATIONS

Copy of European Search Report for Serial No. EP 03 29 0147 dated Apr. 28, 2003.

*Primary Examiner*—Edgardo San Martin
(74) *Attorney, Agent, or Firm*—McCormick, Paulding & Huber LLP

(57) ABSTRACT

The invention provides to make an automatic opening and closing apparatus for a vehicle to be thin. An outer rack is attached to an outer side of a stay fixed to a vehicle in such a manner as to freely move in an axial direction along the stay. A thickness of the stay is set to be smaller than a width, and a cross sectional shape thereof is formed so as to be in a substantially thin convex shape. A width in a base end wall portion of the outer rack is formed so as to be larger than a width of a side surface wall portion corresponding to a thickness of the outer rack, and the outer rack is formed in a substantially thin C cross sectional shape. It is possible to make a thickness of a slide mechanism about a gear with of rack gears lined up in an axial direction in the side surface wall portion by making the width of the side surface wall portion slightly larger than the gear width of the rack gear.

5 Claims, 6 Drawing Sheets

U.S. PATENT DOCUMENTS

| | | | | | |
|---|---|---|---|---|---|
| 6,315,451 | B1 | * | 11/2001 | Michioka et al. | 74/89.32 |
| 6,367,199 | B2 | * | 4/2002 | Sedlak et al. | 49/340 |
| 6,378,392 | B1 | * | 4/2002 | Dombrowski et al. | 74/422 |
| 6,401,392 | B1 | * | 6/2002 | Yuge | 49/340 |
| 6,427,385 | B1 | * | 8/2002 | Fin | 49/340 |
| 6,430,873 | B1 | * | 8/2002 | Borchuk et al. | 49/348 |
| 6,513,859 | B2 | * | 2/2003 | Yuge | 296/146.8 |
| 6,550,839 | B2 | * | 4/2003 | Rogers et al. | 296/56 |

* cited by examiner

AUTOMATIC OPENING AND CLOSING APPARATUS FOR VEHICLE

This application is entitled to the benefit of and incorporates by reference essential subject matter disclosed in Japanese Patent Application No. 2002-017434 filed on Jan. 25, 2002.

TECHNICAL FIELD OF THE INVENTION

The present invention relates to an automatic opening and closing apparatus for a vehicle, which automatically opens and closes an opening and closing member attached to a vehicle so as to be freely opened and closed.

BACKGROUND OF THE INVENTION

Conventionally, in a vehicle such as a motor vehicle or the like, so many opening and closing members are provided, such as a door, a sunroof, a backdoor and the like, the members being attached to a vehicle so as to be freely opened and closed. In particular, in a station wagon vehicle, a minivan vehicle and the like, there are frequently seen a structure in which a backdoor is provided in a rear end portion of the vehicle so as to make it easy to load and unload a baggage from a rear portion of the vehicle. Normally, the backdoor mentioned above is attached to the vehicle via a hinge fixed to a rear end portion of a vehicle roof by setting a rotational supporting point to be horizontal, and is structured such as to open and close in a vertical direction around the rotational supporting point of the hinge. In this case, since the backdoor is largely flipped up above the vehicle, it is also called as a lift gate, a rear hatch or the like.

However, since it is often the case that the backdoor mentioned above is large-scaled and heavy, there is a case that it is hard to easily open and close the backdoor particularly by a woman or a child. In particular, since the backdoor is largely flipped upward at a time when it becomes in a fully open state, it is further hard to open and close the backdoor.

Accordingly, under a condition that a family use of the minivan vehicle or the like is increased, there appears a vehicle in which an automatic opening and closing apparatus for the backdoor is mounted for the purpose of easily opening and closing the backdoor even by the woman or the child, and it tends to be increased. Further, since it is possible to remote operate the backdoor by placing the automatic opening and closing apparatus even when it is beyond a hand of an operator in a driver's seat, it is considerable to required to mount the automatic opening and closing apparatus in view of this convenience.

In the automatic opening and closing apparatus of the backdoor mentioned above, a connection rod is generally connected to a position a predetermined distance apart from the rotational supporting point of the hinge in the backdoor, and the structure is made such that the backdoor is opened and closed by driving the connection rod by means of an actuator. As the actuator of the type mentioned above, there is a structure provided with a slide mechanism having an annular rectangular channel fixed to the vehicle and a rack bar arranged so as to freely move in an axial direction within the channel, and opening and closing the backdoor by integrally oscillating another end of the connection rod with the rack bar in a linear manner, for example, as shown in Japanese Patent Application Laid-Open No. 2001-253241 (the corresponding U.S. patent application Ser. No. 09/756,416 filed on Jan. 8, 2001: patent application Publication No.

US 2001/0047625 A1 published on Dec. 6, 2001). In this case, the actuators are arranged within pillars in both sides of the vehicle in a rear end portion of the vehicle by setting an axial direction of the slide mechanism to be substantially vertical. Rack gears arranged lining up in the axial direction over against a window portion formed in a side wall of the channel are formed in the rack bar, and these rack gears are engaged with pinion gears in the window portion of the channel. The pinion gear is structured such as to be rotated and driven by a power unit having an electric motor corresponding to a drive source, and the electric motor is operated, whereby the structure is made such that the rack bar is linearly oscillated along the channel. Further, a ball stud is fixed to a surface opposite to the rack gear of the rack bar, and the ball stud protrudes to an external portion via a slot extending in the axial direction which is formed in the side wall of the channel so as to be connected to another end of the connection rod. Further, when the electric motor is operated, a linear oscillating motion of the rack bar is converted into the opening and closing operation of the backdoor via the connection rod, whereby the backdoor is automatically opened and closed.

SUMMARY OF THE INVENTION

In the automatically opening and closing apparatus of the backdoor of the type mentioned above, since the actuator is arranged with the pillar of the vehicle, it is required to make the slide mechanism to be arranged in the vehicle upper side within the pillar thin. However, in the conventional actuator, a width of the rack bar is determined in correspondence to a tooth width of the rack gear formed in a shape capable of resisting against a power transmitted from the pinion gear, however, since the channel is arranged in a further outer side with respect to the rack bar, a thickness of the slide mechanism becomes large. Further, since the slit and the window portion are formed in the side wall of the channel, it is necessary to add a rib or the like in which a thickness is set to be large, in order that the channel keeps a sufficient rigidity, so that it is further hard to make the automatic opening and closing apparatus for the vehicle to be thinner.

An object of the present invention is to make an automatic opening and closing apparatus for a vehicle to be thinner.

In accordance with the present invention, there is provided an automatic opening and closing apparatus for a vehicle, which automatically opens and closes an opening and closing member attached to a vehicle in a freely opening and closing manner, comprising:

a guide rail fixed to the vehicle;

a slide member provided with rack gears lining up in an axial direction on an outer peripheral surface and attached to an outer side of the guide rail so as to freely move in the axial direction along the guide rail;

a link mechanism provided between the slide member and the opening and closing member, and transmitting a displacement of the slide member to the opening and closing member; and a driving means having an electric motor for rotating and driving an output pinion gear engaged with the rack gear and the output pinion gear, and oscillating the slide member between a first position at which the opening and closing member is in a fully closed state and a second position at which the opening and closing member is in a fully open state.

The automatic opening and closing apparatus for the vehicle in accordance with the present invention is characterized in that the opening and closing member is attached to a rear end portion of the vehicle in such a manner as to freely pivot around a rotational supporting point of a hinge provided in the rear end portion of the vehicle roof.

The automatic opening and closing apparatus for the vehicle in accordance with the present invention is characterized in that the guide rail is fixed to a pillar portion adjacent to the opening and closing member of the vehicle.

The automatic opening and closing apparatus for the vehicle in accordance with the present invention is characterized in that the guide rail is formed in a substantially convex cross sectional shape having a flat rail portion including a base end surface, a pair of side end surfaces substantially perpendicular to the base end surface and a guide surface substantially in parallel to the base end surface, and having a rib portion protruding at a substantially center portion in a width direction of the guide surface; and the slide member is formed in a substantially C cross sectional shape having a base end wall portion slidably in contact with the base end surface, a pair of side surface wall portions respectively substantially perpendicular to the base end wall portion and slidably in contact with the side end surface, and a pair of guide wall portions respectively substantially in parallel to the base end wall portion and slidably in contact with the guide surface with respect to the rib portion.

The automatic opening and closing apparatus for the vehicle in accordance with the present invention is characterized in that the rack gear is formed in any one of the side surface wall portions, and a width of the side surface wall portion is formed so as to have about a tooth width of the rack gear.

In accordance with the present invention, since no slit or the like is required in the guide rail and the thickness thereof can be formed to be thin, it is possible to form so that the width of the side surface wall portion in the slide member attached to the outer side of the guide rail is about the tooth width of the rack gear, whereby it is possible to form the automatic opening and closing apparatus for the vehicle thin.

BRIEF DESCRIPTIONS OF THE DRAWINGS

DESCRIPTION OF THE PREFERRED EMBODIMENTS

A description will be in detail given below of an embodiment in accordance with the present invention with reference to the accompanying drawings.

Figure 1:
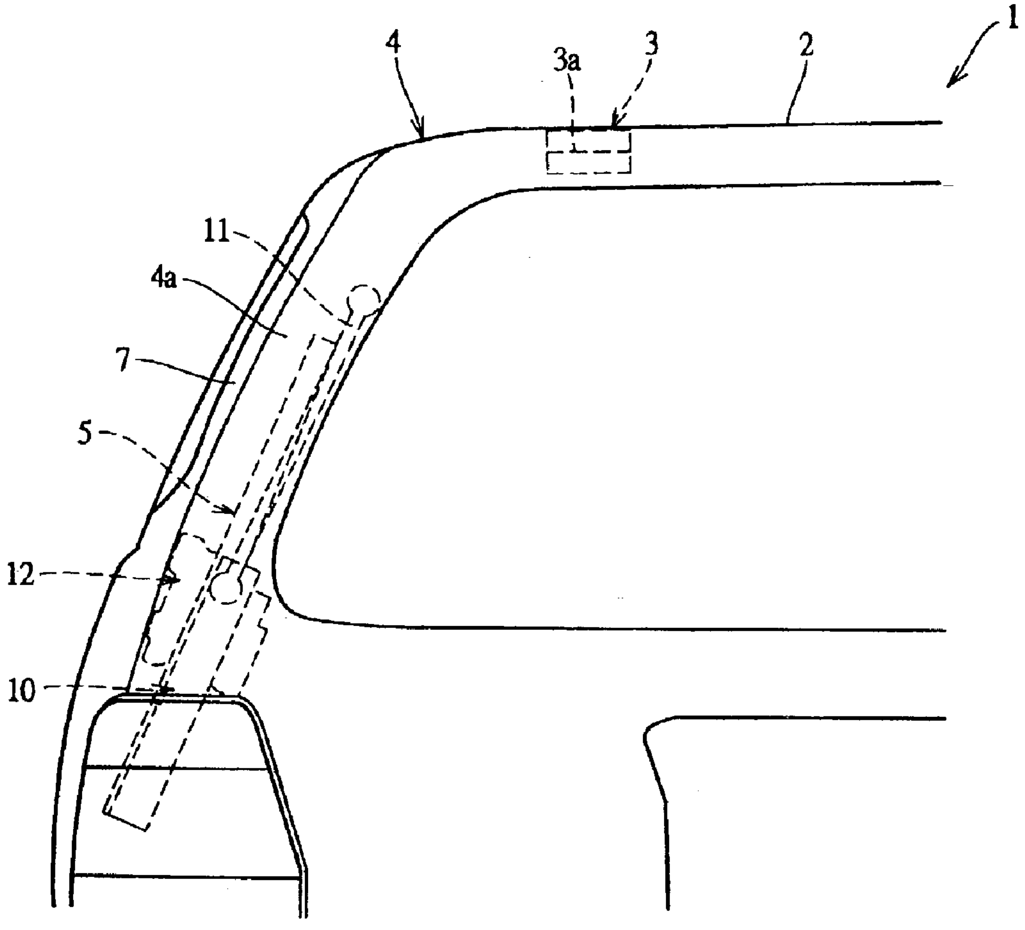
FIG. 1 is a back elevational view showing a part of a vehicle provided with an actuator unit corresponding to one embodiment in accordance with the present invention in a state that a backdoor of the vehicle is fully closed.
Figure 2:
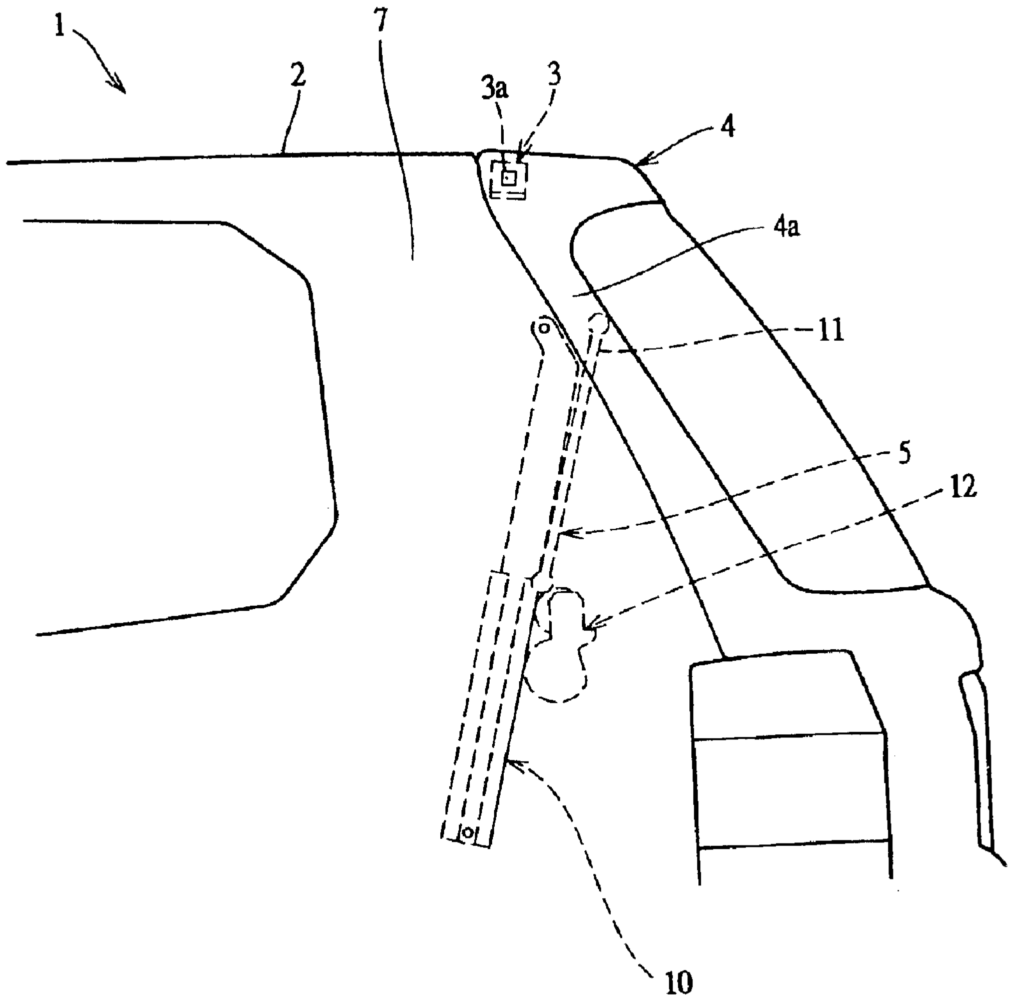
FIG. 2 is a side elevational view showing a part of the vehicle shown in FIG. 1.
Figure 3:
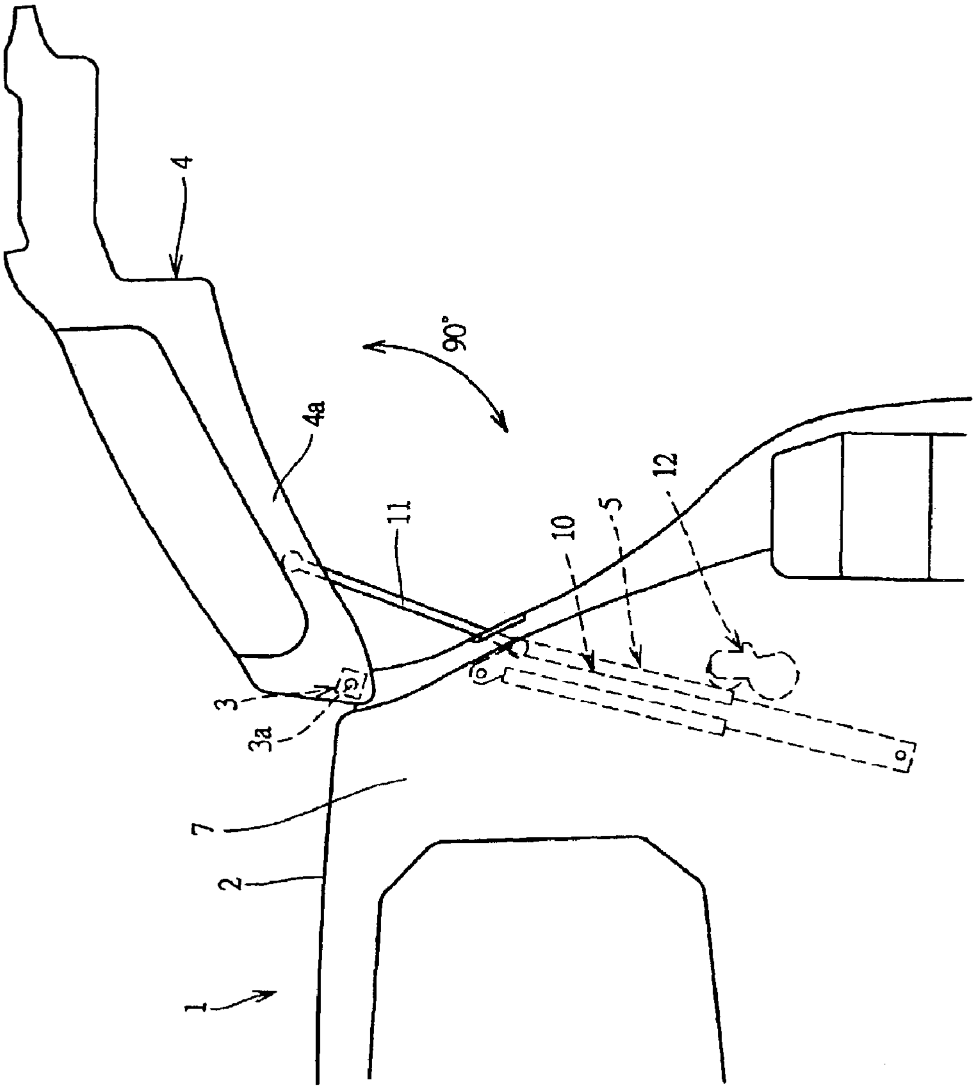
FIG. 3 is a side elevational view showing a part of the vehicle shown in FIG. 2 in a state that the backdoor is fully opened.
Figure 4:
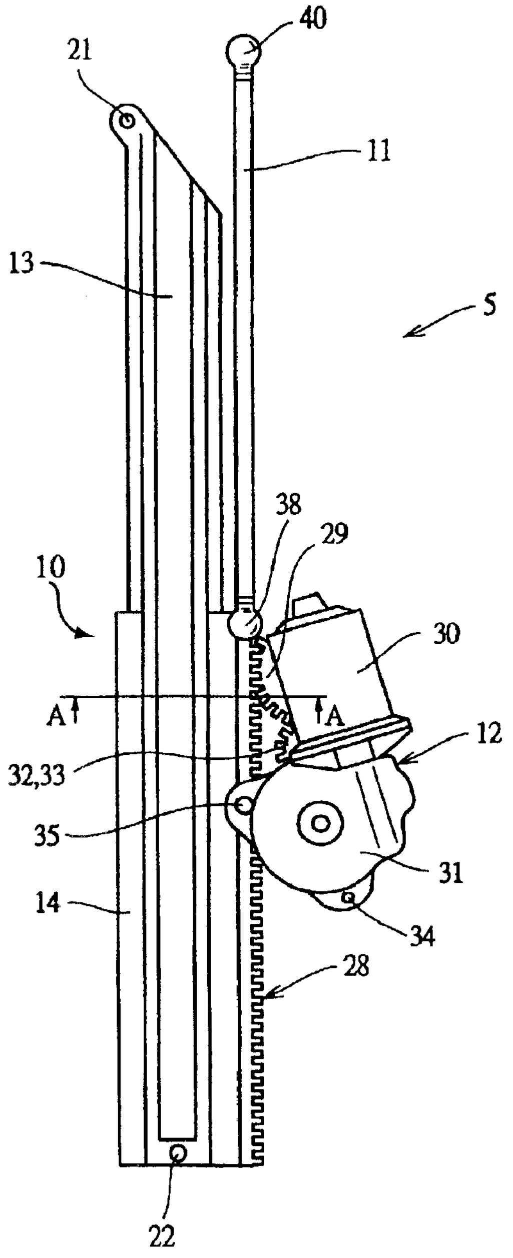
FIG. 4 is a front elevational view showing a detail of an actuator unit shown in FIGS. 1 to 3.
Figure 5:
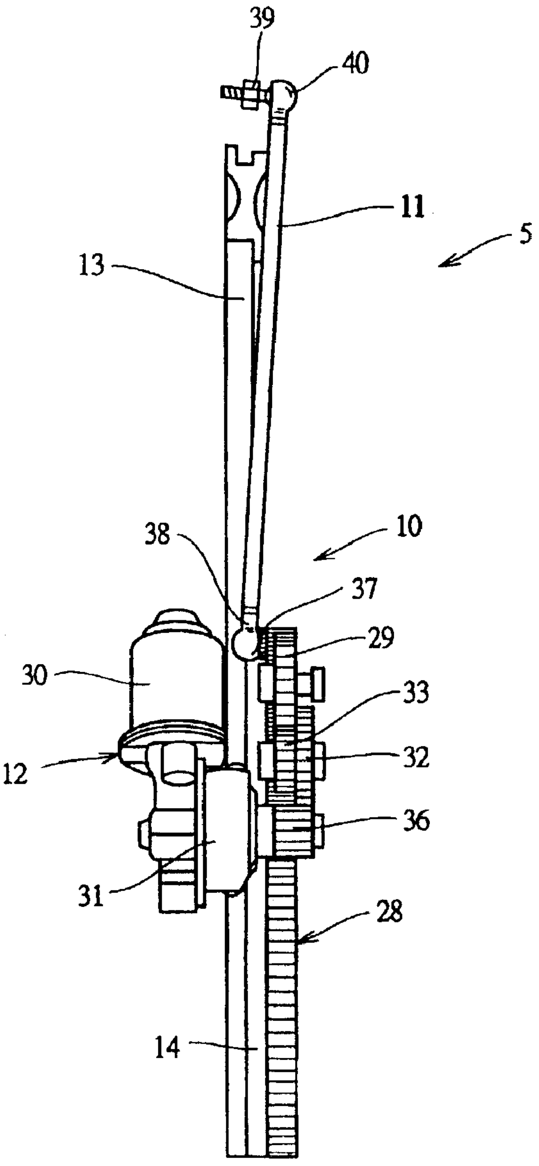
FIG. 5 is a side elevational view of the actuator unit shown in FIG. 4.
Figure 6:
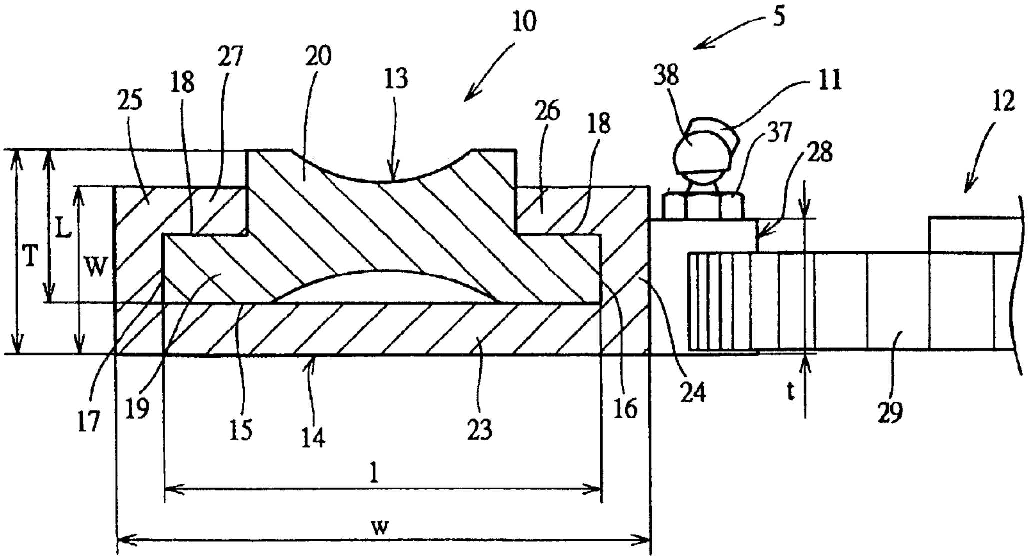
FIG. 6 is a cross sectional view along a line A—A in FIG. 4.
Figure 7:
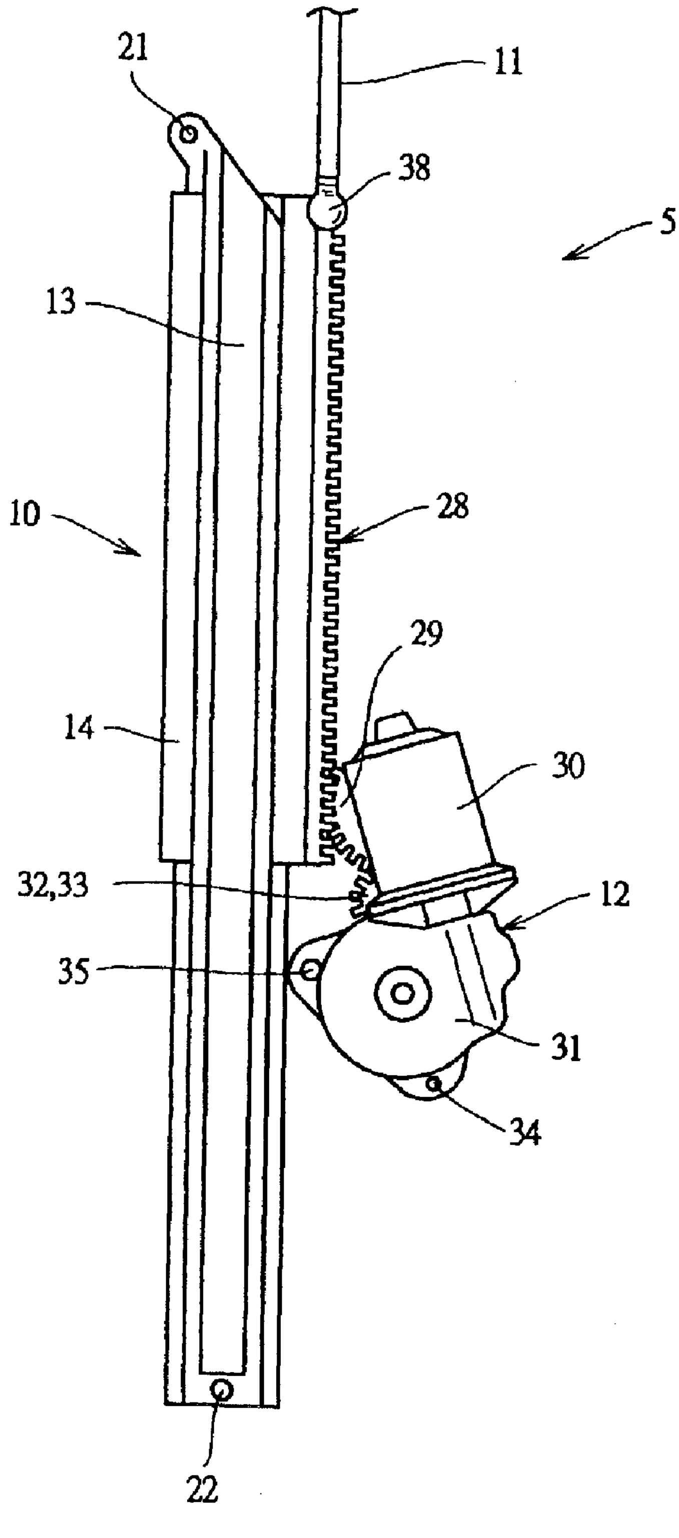
FIG. 7 is a front elevational view showing the actuator unit shown in FIG. 4 in a state that the backdoor is fully opened.

FIG. 1 is a back elevational view showing a part of a vehicle provided with an actuator unit corresponding to one embodiment in accordance with the present invention in a state that a backdoor of the vehicle is fully closed, and FIG. 2 is a side elevational view showing a part of the vehicle shown in FIG. 1. Further, FIG. 3 is a side elevational view showing a part of the vehicle shown in FIG. 2 in a state that the backdoor is fully opened. Further, FIG. 4 is a front elevational view showing a detail of an actuator unit shown in FIGS. 1 to 3, and FIG. 5 is a side elevational view of the actuator unit shown in FIG. 4. Further, FIG. 6 is a cross sectional view along a line A—A in FIG. 4, and FIG. 7 is a front elevational view showing the actuator unit shown in FIG. 4 in a state that the backdoor is fully opened.

As shown in FIGS. 1 and 2, a backdoor 4 is attached to a vehicle 1 via a hinge 3 mounted to a rear end portion of a vehicle roof 2 in such a manner as to be freely pivoted. In this case, a rotational supporting point 3*a* of the hinge 3 is set to be substantially horizontal, and the backdoor 4 is structured such as to freely open and close in a vertical direction with respect to the vehicle 1 in a range about 90 degrees around the rotational supporting point 3*a* of the hinge 3 between a fully closed state being substantially perpendicular as shown in FIGS. 1 and 2 and a fully opened state being substantially horizontal as shown in FIG. 3. In this case, in the present embodiment, the backdoor 4 is attached to the vehicle 1 so as to open and close in a vertical direction, however, the structure is not limited to this, the structure may be made such that the hinge 3 is attached to a side portion of the vehicle by setting the rotational supporting point 3*a* thereof to be substantially vertical and the backdoor 4 is opened and closed in a lateral direction with respect to the vehicle 1. Further, the opening and closing range thereof is not limited to about 90 degrees and may be optionally set.

In order to automatically open and close the backdoor 4, an actuator unit 5 corresponding to an automatic opening and closing apparatus for a vehicle is provided in the vehicle 1. The actuator unit 5 is attached to an inner portion in a pillar portion 7 in a left side of the vehicle adjacent to the backdoor 4 of the vehicle 1, that is, the inner portion in a pillar portion 7 in the left side of the vehicle 1 at a rear end portion of the vehicle 1. In this case, in the present embodiment, one actuator unit 5 is provided, however, the structure is not limited to this, and a plurality of actuator units may be provided. Further, in the present embodiment, the actuator unit 5 is attached within the pillar portion 7 in the left side of the vehicle 1, however, the structure is not limited to this, the actuator unit 5 may be attached to any side of right and left pillar portions, and in the case that a plurality of actuator units 5 are provided, they may be attached within both pillars. In this case, the actuator units 5 may be formed in symmetrical.

A description will be in detail given below of the actuator unit 5.

The actuator unit 5 is structured such as to be of a rack and pinion having a slide mechanism 10, a connection rod 11 corresponding to a link mechanism, and a power unit 12 corresponding to a driving means.

The slide mechanism 10 has a stay 13 serving as a guide rail and an outer rack 14 serving as a slide member. The slide mechanism 10 is structured such that the outer rack 14 is attached to an outer side of the stay 13 so as to freely move in an axial direction.

As shown in FIG. 6, the stay 13 has a flat rail portion 19 including a base end surface 15, a pair of side end surfaces 16 and 17 being substantially perpendicular to the base end surface 15 and a guide surface 18 being substantially in parallel to the base end surface 15, and has a rib portion 20 protruding out to a substantially center portion in a width direction of the guide surface 18. A thickness L of the stay is set to be smaller than a width 1 of the stay, and a cross sectional shape thereof is formed in a substantially convex shape which is thin in a vertical direction in the drawing. Further, it is fixed to the pillar 7 of the vehicle 1 by a fastening member (not shown) in mounting holes 21 and 22 arranged so that an axial direction thereof is substantially in a vertical direction with respect to the vehicle 1, and provided in both end portions in a longitudinal direction thereof.

On the contrary, the outer rack 14 is formed in a substantially C cross sectional shape having a base end wall portion 23 slidably in contact with the base end surface 15 of the stay 13, a pair of side surface wall surfaces 24 and 25 being substantially perpendicular to the base end wall surface 23 and being slidably in contact with the side end surfaces 16 and 17, and a pair of guide wall portions 26 and 27 being respectively substantially in parallel to the base end wall portion 23 and slidably in contact with the guide surface 18 with respect to rib portion 20, as shown in FIG. 6. Further, the structure is made such that the respective wall portions of the outer rack 14 are slidably in contact with the respective surfaces of the stay, whereby the outer rack 14 is attached to the outer side of the stay 13 in such a manner as to freely move in the axial direction along the stay 13. Further, the outer rack 14 is formed so that a width w of the base end wall portion is larger than a width W of the side surface wall portion corresponding to a thickness in the vertical direction in the drawing, thereby being formed in a substantially thin C cross sectional shape.

A plurality of rack gears 28 arranged in an axial direction in the side surface wall portion 24 are formed in the outer rack. A gear width t of the rack gear is set so as to be capable of standing against a power transmitted from an outer pinion gear 29 mentioned below, and a width W of the side surface wall portions 24 and 25 is formed so as to be slightly larger than the gear width t of the rack gear.

As mentioned above, in the actuator unit 5 in accordance with the present invention, since the slit or the like is not required in the stay 13 and it is possible to reduce the thickness L of the stay, it is possible to form the actuator unit 5 to be thin by setting the thickness T of the slide mechanism to about the gear width t of the rack gear by forming the slide surface wall portions 24 and 25 of the outer rack 14 attached to the outer side of the stay 13 so as to have the width W corresponding to about the gear width t of the rack gear.

On the contrary, the power unit 12 has an electric motor 30, a worm gear mechanism 31, first and second speed reduction gears 32 and 33 and an outer pinion gear 29, and is fixed to the vehicle 1 in adjacent to a substantially center portion of the stay 13 in mounting portions 34 and 35 provided in a casing of the worm gear mechanism 31.

The electric motor 30 is connected to a control unit (not shown) mounted on the vehicle 1, and is structured such as to be normally and reversely rotated by a current supplied on the basis of a command of a backdoor opening and closing switch (not shown) provided within a passenger cabin or the like. The worm gear mechanism 31 is connected to an output shaft (not shown) of the electric motor 30, and the structure is made such that a rotation of the electric motor 30 is reduced by the worm gear mechanism 31 and a rotational direction thereof is converted so as to be output from an output gear 36. The structure is made such that a rotation of the output gear 36 is transmitted to the output pinion gear 29 via the first speed reduction gear 34 and the second speed reduction gear 35 coaxially and integrally rotating with the first speed reduction gear 34, that is, the rotation of the output gear 36 is reduced by the speed reduction gears 32 and 33 so as to be transmitted to the output pinion gear 29.

The output pinion gear 29 is engaged with the rack gear 28, and the structure is made such that the electric motor 30 normally and reversely rotates, whereby the power is transmitted to the outer rack 14 from the output pinion gear 29 and the outer rack 14 is linearly oscillated in the axial direction of the stay 13.

A ball stud 37 is fixed at a position of a root portion of the rack gear 28 in a front end side corresponding to an upper side of the outer rack 14 with respect to the vehicle 1. Further, one end of the connection rod 11 is connected to the ball stud 37 via a ball socket 38. Further, a ball stud 39 is fixed at a position a predetermined distance apart from the rotational supporting point 3*a* of the hinge 3 in each of side portions 4*a* in a vehicle width direction of the backdoor 4. Another end of the connection rod 11 is connected to the ball stud 39 via a ball socket 40. The connection rod 11 connects the outer rack 14 to the backdoor 4 in a freely joining manner by the respective ball studs 37 and 39 and the ball sockets 38 and 40, and the structure is made such that a displacement in an axial direction of the outer rack 14 is transmitted to the backdoor 4 by the connection rod 11. In this case, in the present embodiment, the ball stud 37 is fixed so as to be positioned at the root portion of the rack gear 28 in the front end side of the outer rack 14, however, the structure is not limited to this, and the structure may be made such that the ball stud 37 is fixed to any place on the outer rack 14 as far as it does not prevent the outer rack 14 from moving because the outer rack 14 is arranged close to the outer side of the stay 13.

As mentioned above, since the ball stud 37 may be fixed to any place on the outer rack 14, it becomes easy to arrange the connection rod 11, and it is possible to improve a placing property of the actuator unit 5.

Next, a description will be given of an operation of the actuator units 5 and 6 mentioned above.

As shown in FIGS. 1 and 2, in the case that an opening button (not shown) of the opening and closing switch in the backdoor is turned on when the backdoor 4 is in the fully closed state, a current is supplied to the electric motor 30 from a control unit (not shown), and the output pinion gear 29 is rotated in a clockwise direction in FIG. 4. Further, the rotation of the output pinion gear 29 is transmitted to the rack gear 28, and the outer rack 14 is moved upward to, with respect to the vehicle 1, a second position shown in FIG. 7 at which the backdoor 4 becomes in the fully open state from a first position shown in FIG. 4 at which the backdoor 4 becomes in the fully closed state. The displacement is transmitted to the backdoor 4 via the connection rod 11 so as to make the backdoor 4 in the fully open state as shown in FIG. 3.

When a closing button (not shown) of the backdoor opening and closing switch is turned on from the state mentioned above, a current in a reverse direction to that in the case of the opening button is supplied to the electric motor 30 from the control unit (not shown), and the output pinion gear 29 is rotated in a counterclockwise direction in FIG. 4. Further, the rotation of the output pinion gear 29 is transmitted to the rack gear 28, the outer rack 14 is moved downward from the second position shown in FIG. 7 to the first position shown in FIG. 4 with respect to the vehicle 1. The displacement is transmitted to the backdoor 4 via the connection rod 11 so as to make the backdoor 4 in the fully closed state as shown in FIGS. 1 and 2.

The present invention is not limited to the embodiment mentioned above, and it goes without saying that the present invention can be variously modified within the range of the scope of the present invention. For example, in the present embodiment, the opening and closing member is assumed as the backdoor 4 attached to the rear end portion of the vehicle 1, however, the structure is not limited to this, and the other opening and closing member which is attached to the vehicle 1 so as to freely open and close, such as the door, the sunroof or the like may be employed.

Further, in the present embodiment, the connection rod 11 connected to the outer rack 14 and the backdoor 4 is used as the link mechanism, however, the structure is not limited to this, and a link mechanism in accordance with the other aspects may be employed.

Figure 8:
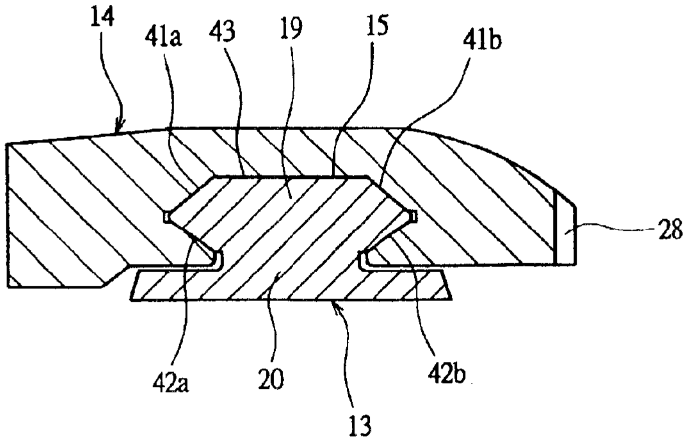
FIG. 8 is a cross sectional view showing a variation of the slide mechanism shown in FIG. 6.

Further, in the present embodiment, though the slide mechanism 10 has a substantially rectangular shape in sectional view in the shape of sliding portion formed of the flat rail portion 19 in the stay 13 and the outer rack 14, it is not limited to this shape and such a substantially hexagonal shape may be adopted as shown in FIG. 8. In this case, the rail portion 19 has the base end surface 15; two obtuse-angled inclined surfaces 41*a* and 41*b* which are obtusely inclined to the base end surface 15 respectively; and two acute-angled inclined surfaces 42*a* and 42*b* which are acutely inclined to the base end surface 15 respectively. In the outer rack 14, there is formed a groove portion 43 having a T-slot shape corresponding to the shape of the rail portion 19. A linear slider mechanism (not shown) is provided in a pair of the obtuse-angled inclined surfaces 41*a* and 41*b* and the acute-angled inclined surfaces 42*a* and 42*b*. In the slide mechanism 10 having the substantially rectangular shape in sectional view, it is difficult, in view of processing accuracy and sliding ability, to provide the linear slider mechanism both between the base end surface 15 and the guide surface 18 and between the side end surfaces 16 and 17. Therefore, the satiability of the outer rack 14 against the rail portion 19 only can be obtained in either direction between the base surface 15 and the guide surface 19 or direction between the side end surfaces 16 and 17. In the construction having a substantially hexagonal shape in section, however, the outer rack 14 is holed by four faces in total to be engaged with the rail portion 19, so that the outer rack 14 can be moved on the rail 19 in more stable state. Further, in the present embodiment, the tooth width of the rack gears 28 sets smaller than that of thickness of the base of the outer rack 14, so that it is possible to have other components of the power unit 12 such as the output pinion gear 29 formed to be thinner and possible to form the opening and closing apparatus for vehicle to be thinner in total. In FIG. 8, the same numerals are used for the parts corresponding to the parts as mentioned above.

In accordance with the present invention, since no slit or the like is required in the guide rail and the thickness thereof can be formed to be thin, it is possible to make the width of the side surface wall portion of the slide member attached to the outer side of the guide rail about the gear width of the rack gear, and it is possible to form the automatic opening and closing apparatus for the vehicle thin.

Further, in accordance with the present invention, since the link mechanism may be connected to any place on the slide member, it becomes easy to arrange the link mechanism, and it is possible to improve the placing property of the automatic opening and closing apparatus for the vehicle.

What is claimed is:

1. An automatic opening and closing apparatus for a vehicle, which automatically opens and closes an opening and closing member attached to a vehicle in a freely opening and closing manner, comprising:

a guide rail provided with a guide surface, said guide rail being formed to have a flat shape extending toward the axial direction and fixed to said vehicle;

a slide member having a rack portion provided with rack gears lining up in an axial direction on an outer peripheral surface of said rack portion and having a slide portion attached to an outer side of said guide rail so as to freely move in the axial direction along said guide surface of said guide rail;

a link mechanism provided between said slide member and said opening and closing member, and transmitting a displacement of said slide member to said opening and closing member; and a driving means having an electric motor for rotating and driving an output pinion gear engaged with said rack gear and said output pinion gear, and oscillating said slide member between a first position at which said opening and closing member is in a fully closed state and a second position at which said opening and closing member is in a fully open state.

2. An automatic opening and closing apparatus for a vehicle according to claim 1, wherein said opening and closing member is attached to a rear end portion of said vehicle in such a manner as to freely pivot around a rotational supporting point of a hinge provided in the rear end portion of said vehicle roof.

3. An automatic opening and dosing apparatus for a vehicle according to claim 2, wherein said guide rail is fixed to a pillar portion adjacent to said opening and dosing member of said vehicle.

4. An automatic opening and dosing apparatus for a vehicle according to claim 1, wherein said guide rail is formed in a substantially convex cross sectional shape having a flat rail portion including a base end surface, a pair of side end surfaces substantially perpendicular to said base end surface and said guide surface substantially in parallel to said base end surface, and having a rib portion protruding at a substantially center portion in a width direction of said guide surface; and said slide member is formed in a substantially C cross sectional shape having a base end wall portion slidably in contact with said base end surface, a pair of side surface wall portions respectively substantially perpendicular to said base end wall portion and slidably in contact with said side end surface, and a pair of guide wall portions respectively substantially in parallel to said base end portion and slidably in contact with said guide surface with respect to said rib portion.

5. An automatic opening and closing apparatus for a vehicle according to claim 4, wherein said rack gear is formed in any one of said side surface wall portions, and a width of said side surface wall portion is formed so as to have about a tooth width of said rack gear.

* * * * *

UNITED STATES PATENT AND TRADEMARK OFFICE

CERTIFICATE OF CORRECTION

PATENT NO. : 6,891,344 B2
DATED : May 10, 2005
INVENTOR(S) : Hiroshi Sakai et al.

It is certified that error appears in the above-identified patent and that said Letters Patent is hereby corrected as shown below:

Column 8,
Lines 39, 41 and 43, "dosing" should read -- closing --.

Signed and Sealed this

Twelfth Day of July, 2005

JON W. DUDAS
*Director of the United States Patent and Trademark Office*